United States Patent
Sato

(10) Patent No.: US 7,860,153 B2
(45) Date of Patent: Dec. 28, 2010

(54) MOBILE TERMINAL, RECEPTION DECISION METHOD IN A MOBILE TERMINAL AND PROGRAM

(75) Inventor: Kazunori Sato, Tokyo (JP)

(73) Assignee: NEC Corporation, Tokyo (JP)

(*) Notice: Subject to any disclaimer, the term of this patent is extended or adjusted under 35 U.S.C. 154(b) by 1143 days.

(21) Appl. No.: 11/085,162

(22) Filed: Mar. 22, 2005

(65) Prior Publication Data

US 2005/0213641 A1    Sep. 29, 2005

(30) Foreign Application Priority Data

Mar. 23, 2004    (JP)    ............................. 2004-084807

(51) Int. Cl.
     *H04B 1/00*      (2006.01)
(52) U.S. Cl. ..................................................... 375/148
(58) Field of Classification Search .................. 375/148
See application file for complete search history.

(56) References Cited

U.S. PATENT DOCUMENTS

| | | | | |
|---|---|---|---|---|
| 4,914,418 | A * | 4/1990 | Mak et al. | 370/201 |
| 5,909,471 | A * | 6/1999 | Yun | 375/343 |
| 6,397,368 | B1 * | 5/2002 | Yonge et al. | 714/792 |
| 6,885,988 | B2 * | 4/2005 | Chen | 704/228 |
| 7,072,663 | B2 * | 7/2006 | Ramos et al. | 455/453 |
| 2001/0034254 | A1 * | 10/2001 | Ranta | 455/574 |
| 2003/0021243 | A1 * | 1/2003 | Hamalainen | 370/329 |
| 2003/0192003 | A1 * | 10/2003 | Das et al. | 714/758 |
| 2004/0001428 | A1 * | 1/2004 | Datta et al. | 370/208 |
| 2004/0196793 | A1 * | 10/2004 | Lucidarme et al. | 370/252 |
| 2006/0209937 | A1 * | 9/2006 | Tanaka et al. | 375/219 |

FOREIGN PATENT DOCUMENTS

| | | |
|---|---|---|
| JP | 6-209274 | 7/1994 |
| JP | 06209274 A * | 7/1994 |
| JP | 2000-138633 | 5/2000 |
| JP | 2001-196974 | 7/2001 |

(Continued)

OTHER PUBLICATIONS

Qingyu Miao, "An investigation of channel access with measurement error in the CDMA system", Conference on Circuits and Systems, 2000, IEEE APCCAS 2000, The 2000 IEEE Asia-Pacific Conference on Dec. 4-6, 2000 pp. 251-254.*

(Continued)

*Primary Examiner*—Juan A Torres
(74) *Attorney, Agent, or Firm*—McGinn Intellectual Property Law Group, PLLC

(57) ABSTRACT

A method, and a mobile terminal incorporating the same, of carrying out a reception decision uses a signal received from a base station in the mobile terminal. The mobile terminal includes a communication parameter calculating unit for calculating a communication parameter that is used for estimating a state of a communication environment based on a reception signal transmitted from a base station, a decision parameter setting unit for calculating a decision parameter based on a result of estimation for the state of the communication environment generated by using the communication parameter calculated by the communication parameter calculation unit, and a reception decision unit for carrying out a reception decision of the reception signal based on the decision parameter set by the decision parameter setting unit.

20 Claims, 4 Drawing Sheets

FOREIGN PATENT DOCUMENTS

| | | |
|---|---|---|
| JP | 2003-051763 | 2/2003 |
| JP | 2003-198513 | 7/2003 |
| JP | 2003198513 A * | 7/2003 |

OTHER PUBLICATIONS

Sliskovic, "Robust digital receiver for frequency redundant digital communications over power lines", The 6th IEEE International Conference on Electronics, Circuits and Systems, 1999, Proceedings of ICECS '99, vol. 1, Sep. 5-8, 1999 pp. 457-460 vol. 1.*

Chinese Office Action dated May 25, 2007 with English translation.

Japanese Office Action issued in Appl. No. 2004-084807 on Sep. 2, 2009 (with partial English translation).

* cited by examiner

MOBILE TERMINAL, RECEPTION DECISION METHOD IN A MOBILE TERMINAL AND PROGRAM

BACKGROUND OF THE INVENTION

1. Field of the Invention

The present invention relates to a mobile terminal which estimates a state of a communication environment using a signal received from a base station and carries out a reception decision based on the estimation results, a reception decision method in a mobile terminal, and its program.

2. Description of the Related Art

Conventionally, there has been a mobile terminal such as a cellular phone, which receives a signal transmitted from a base station and carries out a reception decision using a signal interference ratio (SIR), a bit error rate (BER), or the like which are obtained from the reception signal (see, for example, JP 2003-198513 A).

In this type of a mobile terminal, the reception decision using SIR, BER is carried out on the basis of a parameter such as reference value, namely a reference value of SIR, a reference value of BER, or a reception decision period which is set beforehand.

However, in the above-mentioned conventional technique, a decision parameter such as the reference value which is used for deciding the reception signal, BER, or Block Error Rate (BLER) is a fixed value to be uniquely decided. Therefore, in the conventional technique, a reception decision corresponding to a radio wave propagation state that changes depending upon states of a surrounding environment including atmospheric temperature and humidity is not possible to carry out.

SUMMARY OF THE INVENTION

The present invention has been made to solve the above and other exemplary problems, and therefore an exemplary feature of the present invention is to estimate a communication environment using a signal received from a base station and carry out a reception decision of the reception signal based on the estimation results.

Another feature of the present invention is to reduce a waste of power consumption.

In order to attain the above-mentioned and other exemplary features, the present invention provides a mobile terminal, including: communication parameter calculating unit for calculating a communication parameter that is used for estimating a state of a communication environment based on a signal transmitted from a base station; decision parameter setting unit for calculating a decision parameter based on the communication parameter calculated by the communication parameter calculation unit; and reception decision unit for carrying out a reception decision of the reception signal based on the decision parameter set by the decision parameter setting unit.

The communication parameter may include at least one of: a target SIR that shows an appropriate value of SIR in a communication network between the mobile terminal and the base station; a finger number that shows a number of paths at the time of being transmitted from the base station via a plurality of paths; and a Common Pilot Channel (CPICH)—Received Signal Code Power (RSCP) that shows a power value of each code of the reception signal transmitted from the base station by using a common pilot channel.

Also the decision parameter may include one of a SIR reference value, a BER reference value, and a reception decision period, which is calculated on the basis of at least one of the target SIR, the finger number, and the CPICH-RSCP each serving as the communication parameter.

Further the decision parameter is appropriately updated based on comparison with a preset threshold and one of the target SIR, the finger number, and the CPICH-RSCP each serving as the communication parameter.

Also, a program for executing the reception decision according to the present invention is executed on a computer. This program includes each step which includes communication parameter calculating, decision parameter setting, and reception decision.

The exemplary mobile terminal constituted as described above obtains the SIR and BLER using the reception signal, and calculates the target SIR indicating the appropriate value of the SIR corresponding to the communication environment between the mobile terminal and the base station on the basis of at least one of the reception signal, the SIR and BLER.

Also the mobile terminal estimates the state of the communication environment based on one of the finger number and CPICH-RSCP obtained from the reception signal. On the basis of those parameters, the decision parameter is set and is used to decide the reception signal.

Accordingly, the mobile terminal estimates the state of the communication environment based on the target SIR, the finger number, and the CPICH-RSCP, sets the decision parameter which the estimation result is reflected, and thereby is able to carry out the reception decision using the reception signal.

Further, in the case where it is apparent that the communication environment is satisfactory, it is possible to communicate with lower electric power in accordance with update of the standard of the reception decision.

BRIEF DESCRIPTION OF THE DRAWINGS

The above and other exemplary features, and advantages of the present invention will become more apparent from the following detailed description when taken in conjunction with the accompanying drawings wherein.

DETAILED DESCRIPTION OF THE EXEMPLARY EMBODIMENTS

Hereinafter, a description will be given in more detail of an exemplary terminal according to the present invention with reference to the accompanying drawings.

Figure 1:
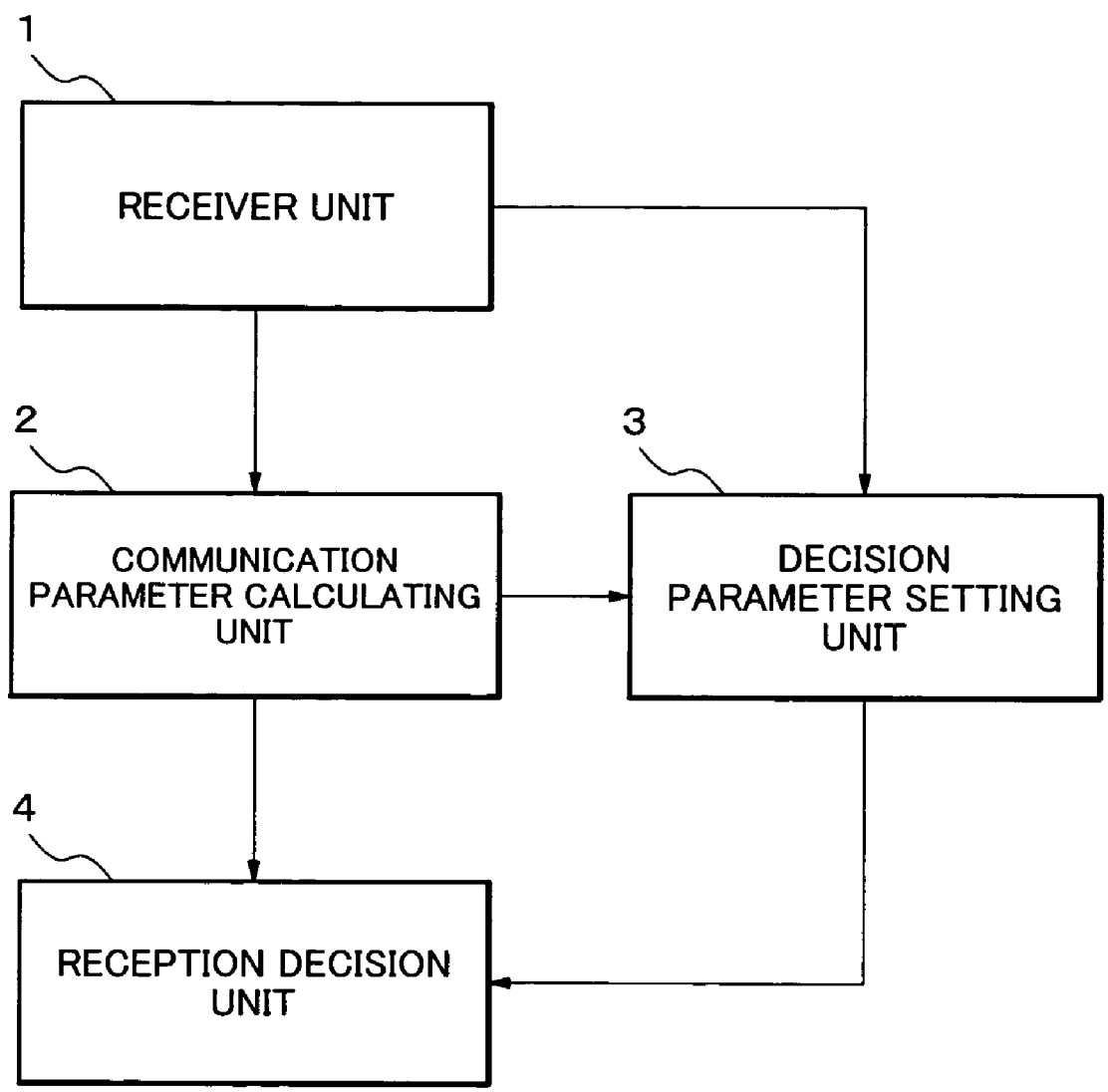
FIG. 1 is a block diagram showing a structure of a mobile terminal according to an exemplary embodiment of the present invention.

FIG. 1 is a block diagram showing a structure of the mobile terminal according to the exemplary embodiment of the present invention.

Referring to FIG. 1, the mobile terminal according to the embodiment of the present invention includes a receiver unit 1, a communication parameter calculating unit 2, a decision parameter setting unit 3, and a reception decision unit 4.

Then, an operation of the respective units of, the mobile terminal according to this exemplary embodiment will be described with reference to the accompanying drawings.

The receiver unit 1 receives a signal transmitted from a base station, and outputs a reception data after frequency conversion to the communication parameter o calculating unit 2 and the decision parameter setting unit 3.

The communication parameter calculating unit 2 calculates a BER, a block error rate (BLER) and so on using the reception data outputted from the receiver unit 1. The BER and BLER may be obtained from the reception signal with which CRC (Cyclic Redundancy Check) is attached as indicated by the standards of 3GPP (3rd Generation Partnership Project) TS 34.108. The communication parameter calculating unit 2 further calculates a communication parameter based on the reception data, the BER and BLER, and outputs the communication parameter to the decision parameter setting unit 3. The communication parameter obtained here includes the following three parameters (1) to (3) as parameters used for estimating states of a communication network environment that has been established between the mobile terminal and the base station.

(1) Target SIR

A parameter which shows an appropriate value of an SIR suitable for a communication network environment between the mobile terminal and the base station.

(2) Finger Number

A parameter which shows the number of paths at the time of being transmitted from the base station via a plurality of paths.

(3) Common Pilot Channel-Received Signal Code Power (CPICH-RSCP)

A parameter which shows a power value of each code of the reception signal transmitted from the base station by using a common pilot channel.

The decision parameter setting unit 3 sets a decision parameter for carrying out the reception decision based on the communication parameter calculated by the communication parameter calculating unit 2, and outputs the decision parameter to the reception decision unit 4. As the decision parameter, a SIR reference value, BER reference value, a reception decision period, or the like are set based on at least any one of the communication parameters, that is, the target SIR, finger number, and CPICH-RSCP. The decision parameter setting unit 3 compares the communication parameter with a preset threshold, and based on the comparison results decides whether or not to update a set value of the decision parameter at the present time.

In other words, the decision parameter setting unit 3 updates the decision parameter appropriately in response to a change of communication environment. For example, in case of setting up the SIR reference value, if a communication is possible by an SIR smaller than the reference value, the decision parameter setting unit 3 decides that communication environment is satisfactory and changes the decision parameter.

The reception decision unit 4 carries out the reception decision of the reception data outputted from the communication parameter calculating unit 2 based on the decision parameter set by the decision parameter setting unit 3.

That is, the reception decision unit 4 uses any one of the SIR reference value, the BER reference value, and the reception decision period which has been set as the decision parameter to carry out the reception decision of the SIR or BER obtained from the reception data. That is, this decision parameter setting unit 3 updates a decision parameter suitably according to change of communication environment.

Here, the reception decision of the mobile terminal according to the embodiment of the present invention can be executed using a computer. When it is executed on the computer, the programs for executing the communication parameter calculating, the decision parameter setting, and the reception decision are stored in a disk, a semiconductor memory, or any other recording media. The programs are loaded into the computer. The computer performs the operation in accordance with the loaded program, whereby the communication parameter calculating unit 2, the decision parameter setting unit 3, and the reception decision unit 4 are executed on the computer.

Next, an operation of reception decision of the mobile terminal shown in FIG. 1 will be described. Here, according to the communication environment between the mobile terminal and the base station, the case where a setup of the reception decision period which is one of the decision parameters is changed suitably is explained.

Figure 2:
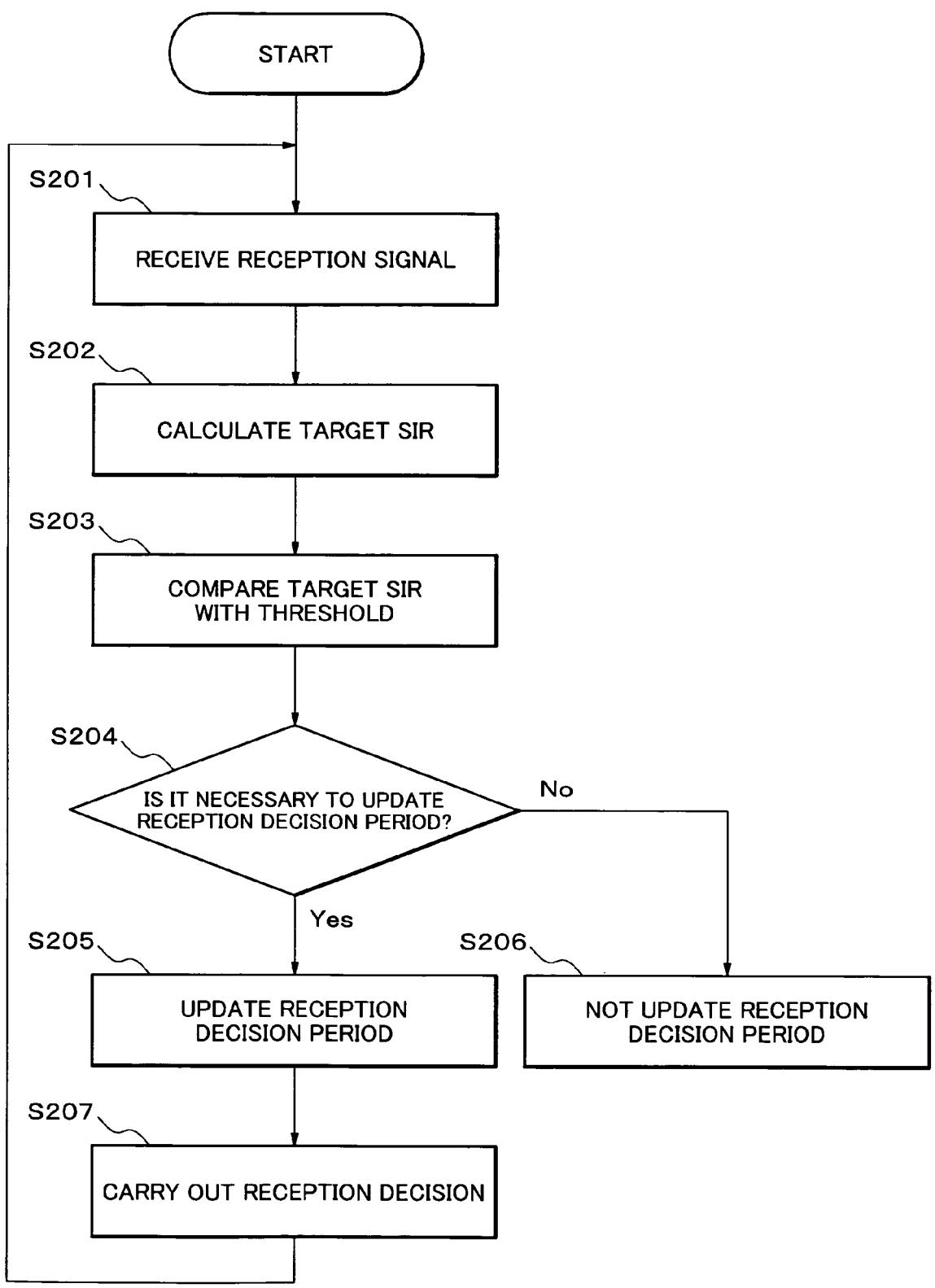
FIG. 2 is a flowchart for explaining an exemplary operation in case of carrying out the reception decision by using a target SIR as a communication parameter in the mobile terminal shown in FIG. 1.

First, operation in the case of carrying out the reception decision using the target SIR which is one of the exemplary communication parameters is explained. FIG. 2 is a flow chart explaining operation in the case of carrying out the reception decision using target SIR as a communication parameter in the mobile terminal shown in FIG. 1.

Referring to FIG. 2, the receiver unit 1 receives a signal from the base station (step S201), and outputs reception data by which frequency conversion was carried out from the reception signal to the communication parameter calculating unit 2.

The communication parameter calculating unit 2 first calculates the BER or BLER using the reception data outputted from the receiver unit 1. The communication parameter calculating unit 2 further calculates the target SIR (dB) which is the communication parameter based on the calculated BER or BLER (step S202). The target SIR is set within a preset range (a maximum value, a minimum value, and a default value) as the optimal SIR value in the communication environment between the mobile terminal and the base station.

The decision parameter setting unit 3 compares the target SIR calculated by the communication parameter calculating unit 2 with a preset threshold (step S203). Based on the comparison results, it is decided whether it is necessary to update a setting value of the reception decision period (sec) which is set as the decision parameter at the present time (step S204).

Here, the threshold above-mentioned may be decided to satisfy the reception quality specified beforehand, on the basis of the reception performance which is calculated theoretically from receiver structure of the mobile terminal.

For example, if it is decided that the target SIR is smaller than the threshold as a result of the comparison of step S203, the decision parameter setting unit 3 can estimate that the communication environment is satisfactory. This reason is as follows. The threshold is a parameter for estimating communication environment, and the target SIR is a target value set up based on a SIR measured using the signal received in the occasional communication environment. Therefore, if communication is possible at a small SIR, it will be decided that the communication environment is satisfactory.

In other words, the decision parameter setting unit 3 determines that the communication environment is satisfactory enough to carry out communications with a small SIR without causing a failure, and therefore decides that the setting value of the reception decision period at the present time can be made longer than the default value (YES in step S204).

In contrast, if it is decided that the target SIR is larger than the threshold as a result of the comparison, the decision parameter setting unit 3 can estimate that the communication environment is not satisfactory. Thus, if the reception decision period at the present time is longer than the default value, it is decided that the reception decision period needs to be made shorter than the default value (YES in step S204).

On the other hand, if there is almost no difference between the target SIR and the old as a result of the comparison, it is decided that the update is unnecessary (NO in step S204). Accordingly, if it is decided that the reception decision period at the present time needs to be updated in step S204, then the decision parameter setting unit 3 updates the set value of the reception decision period (step S205). If it is decided that the reception decision period at the present time does not need to be updated, then the decision parameter setting unit 3 holds the set value of the reception decision period (step S206).

Subsequently, based on the reception decision period whose setting has been updated in step S205 or the reception decision period whose setting has been held (e.g., not changed) in step S206, the reception decision unit 4 carries out the reception decision using the SIR or BER obtained from the reception data (step S207).

Figure 3:
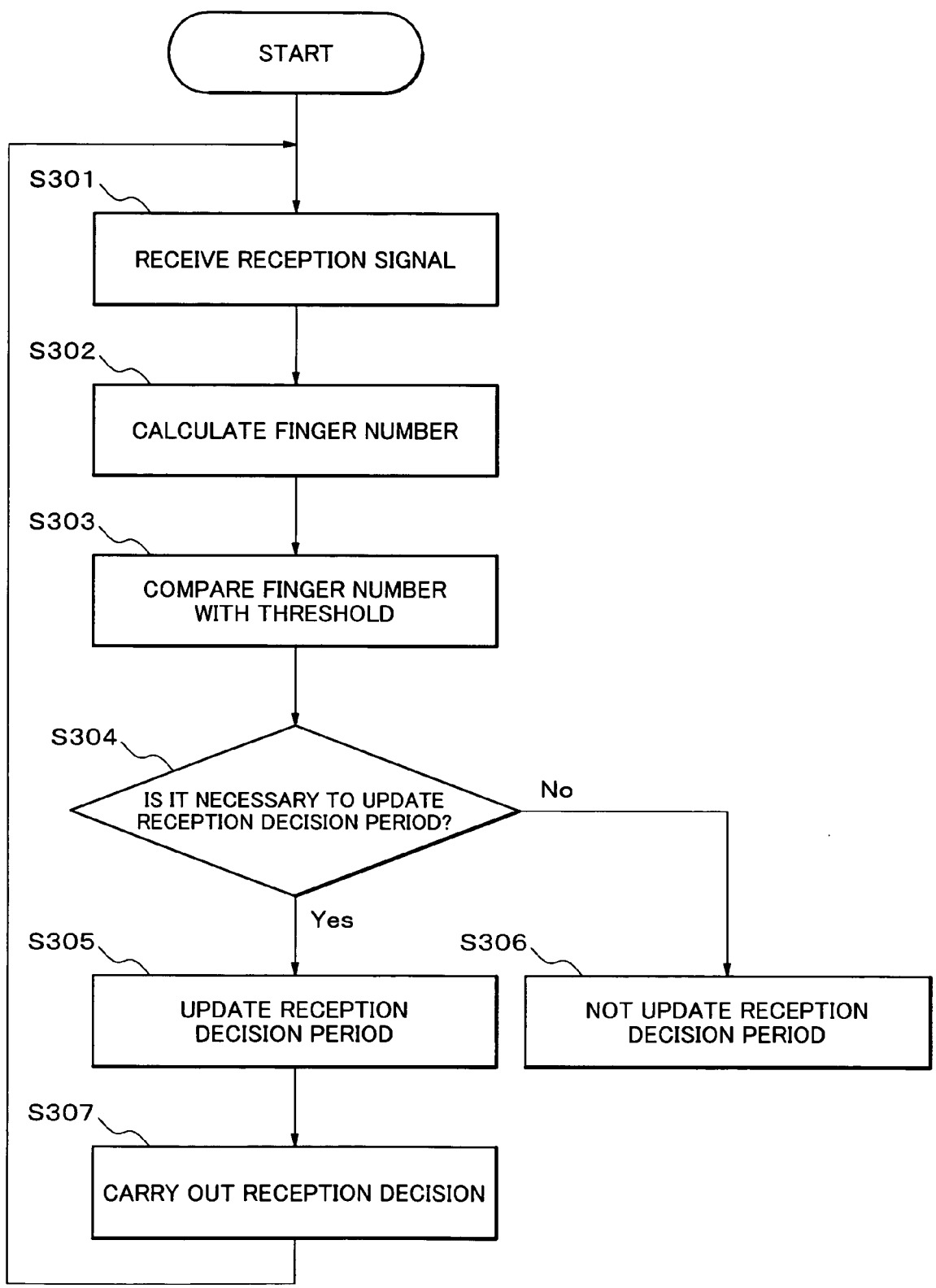
FIG. 3 is a flowchart for explaining an exemplary operation in case of carrying out the reception decision by using a finger number as a communication parameter in the mobile terminal shown in FIG. 1.

Next, operation in the case of carrying out the reception decision using the finger number as the communication parameters is explained. FIG. 3 is a flowchart for explaining the operation in the case of carrying out the reception decision using the finger number as the communication parameter in the mobile terminal shown in FIG. 1.

Referring to FIG. 3, the receiver unit 1 receives a signal from the base station (step S301), and outputs reception data by which frequency conversion was carried out from the reception signal to the communication parameter calculating unit 2.

The communication parameter calculating unit 2 first calculates the finger number as the communication parameter using the reception data outputted from the receiver unit 1 (step S302). The finger number represents the number of paths through which the signal is transmitted from the base station. The finger number can be obtained by, for example, calculating a correlation value between reception signals received by the receiver unit 1.

The decision parameter setting unit 3 compares the finger number calculated by the communication parameter operating unit 2 with a preset threshold (step S303) Based on the comparison results, it is decided whether it is necessary to update a setting value of the reception decision period (sec) which is set as the decision parameter at the present time (step S304).

Here, the threshold above-mentioned may be decided to satisfy the reception quality specified beforehand, on the basis of the reception performance which is calculated theoretically from receiver structure of the mobile terminal.

For example, if it is decided that the finger number is smaller than the threshold as a result of the comparison of step S303, the decision parameter setting unit 3 can estimate that the communication environment is satisfactory. This reason is as follows. The threshold is a parameter for estimating communication environment, and the finger number is a value which includes the number of paths by the reflective waves with the occasional communication environment. Therefore, if there are small fingers, then it will be decided that there are small paths by reflective waves and the communication environment is satisfactory.

In other words, the decision parameter setting unit 3 determines that the communication environment is satisfactory enough to carry out communications with a small number of finger numbers without causing a failure, and therefore decides that the setting value of the reception decision period at the present time can be made longer than the default value (YES in step S304).

In contrast, if it is decided that the finger number is larger than the threshold as a result of the comparison, the decision parameter setting unit 3 can estimate that the communication environment is not satisfactory. Thus, if the reception decision period at the present time is longer than the default value, it is decided that the reception decision period needs to be made shorter than the default value (YES in step S304).

On the other hand, if there is almost no difference between the finger number and the threshold as a result of the comparison, then it is decided that the update is unnecessary (NO in step S304). Accordingly, if it is decided that the reception decision period at the present time needs to be updated in step S304, the decision parameter setting unit 3 updates the set value of the reception decision period (step S305).

If it is decided that the reception decision period at the present time does not need to be updated, then the decision parameter setting unit 3 holds the setting value of the reception decision period (step S306).

After that, based on the reception decision period whose setting has been updated in step S305 or the reception decision period whose setting has been held in step S306, the reception decision unit 4 carries out the reception decision on the SIR or BER obtained from the reception data (step S307).

Figure 4:
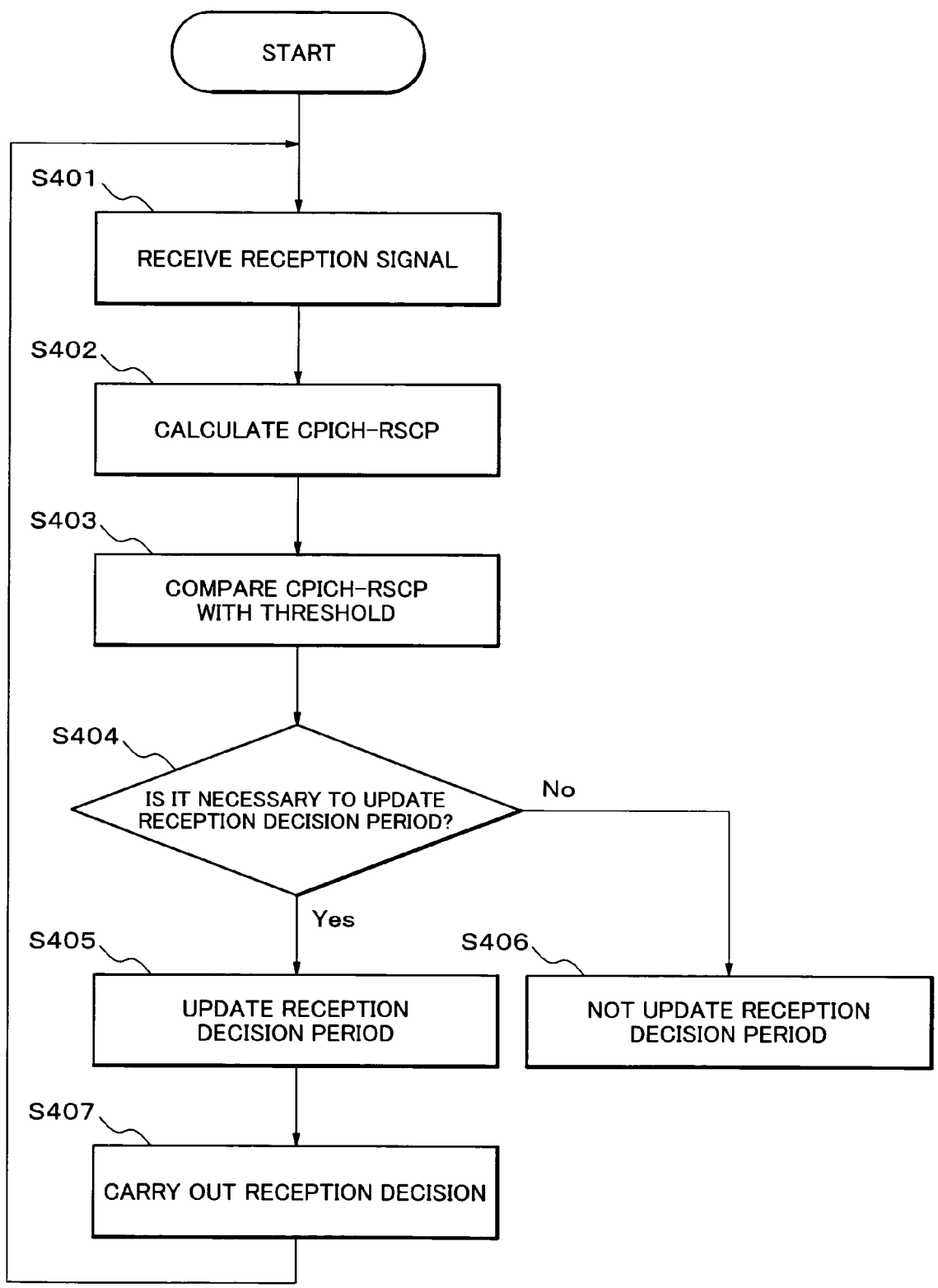
FIG. 4 is a flowchart for explaining an exemplary operation in case of carrying out the reception decision by using a CPICH-RSCP as a communication parameter in the mobile terminal shown in FIG. 1.

Next, operation in the case of carrying out the reception decision using a CPICH-RSCP as the communication parameter is explained. FIG. 4 is a flowchart for explaining the operation in the case of carrying out the reception decision using the CPICH-RSCP as the communication parameter in the mobile terminal shown in FIG. 1.

Referring to FIG. 4, the receiver unit 1 receives a signal from the base station (step S401), and outputs reception data by which frequency conversion was carried out from the reception signal to the communication parameter calculating unit 2.

The communication parameter calculating unit 2 first calculates the CPICH-RSCP (dB) as the communication parameter using the reception data outputted from the receiver unit 1 (step S402). The CPICH-RSCP is obtained by, for example, calculating a power value of each code of the reception signal transmitted by using a CPICH among reception signals received by the receiver unit 1.

Next, the decision parameter setting unit 3 compares the CPICH-RSCP calculated by the communication parameter calculating unit 2 with a preset threshold (step S403). Based on the comparison results, it is decided whether it is necessary to update a setting value of the reception decision period (sec), which is set as the decision parameter at the present time (step S404).

Here, the threshold above-mentioned may be decided to satisfy the reception quality specified beforehand, on the basis of the reception performance which is calculated theoretically from receiver structure of the mobile terminal.

For example, if it is decided that the CPICH-RSCP is larger than the threshold as a result of the comparison of step S403, the decision parameter setting unit 3 can estimate that the communication environment is satisfactory. This reason is as follows. The threshold is a parameter for estimating a communication environment, and the CPICH-RSCP is a received electric power value allowed with the propagation loss to change by the occasional communication environment.

Therefore, if the CPICH-RSCP is large, it will be decided that there is small propagation loss and the communication environment is satisfactory.

In other words, the decision parameter setting unit 3 determines that the communication environment is satisfactory enough to carry out communications with a sufficient CPICH-RSCP without causing a failure, and therefore decides that the setting value of the reception decision period at the present time can be made longer than the default value (YES in step S404).

In contrast, if it is decided that the CPICH-RSCP is lower than the threshold as a result of the comparison, the decision parameter setting unit 3 can estimate that the communication environment is not satisfactory. Thus, if the reception decision period at the present time is longer than the default value, it is decided that the reception decision period needs to be made shorter than the default value (YES in step S404). On the other hand, if there is almost no difference between the CPICH-RSCP and the threshold as a result of the comparison, it is decided that the update is unnecessary (NO in step S404). Accordingly, if it is decided that the reception decision period at the present time needs to be updated in step S404, the decision parameter setting unit 3 updates the set value of the reception decision period (step S405). If it is decided that the reception decision period at the present time does not need to be updated, the decision parameter setting unit 3 holds the set value of the reception decision period (step S406).

After that, based on the reception decision period whose setting has been updated in step S405 or the reception decision period whose setting has been held in step S406, the reception decision unit 4 carries out the reception decision on the SIR or BER obtained from the reception data (step S407).

According to this exemplary embodiment as described above, the mobile terminal of the present invention has been carried out the reception decision of a reception signal by using any one of the target SIR, the finger number, and the CPICH-RSCP as the communication parameter. Then suitable communication parameters may be employed by the present invention without deciding priority. Furthermore, the present invention is not limited to this embodiment, and the reception decision may be carried out on a reception signal by using any two or more of the target SIR, the finger number, and the CPICH-RSCP as communication parameters.

For example, when it combines with the finger number and the CPICH-RSCP, the next four cases are classified.
(a) The finger number is small, and the CPICH-RSCP is large.
(b) The finger number is small, and the CPICH-RSCP is small.
(c) The finger number is large, and the CPICH-RSCP is large.
(d) The finger number is large, and the CPICH-RSCP is small.

Here, as to the communication environment, it is shown that the case (a) is more than satisfactory, and case (d) is far from satisfactory. Based on this decision result, it is possible to grasp the communication environment more accurately, and it is possible to raise the precision of reception decision.

In explanation above, it is the case where a setup of the reception decision period is changed suitably, but also it is possible to use a setup of the reception decision level.

Concerning the each case above-mentioned, if it is apparent that the communication environment is satisfactory, it is possible to control communications to be carried out with lower power in accordance with a change in reference of the reception decision. In other words, if it makes the reception decision period long (or, the reception decision frequency small), or the reception decision level low, it is possible to control communications to be carried out with lower power. Here, the reception decision period may be changed suitably within a preset range, by increasing and decreasing in incremental steps, or based on the estimation results or the comparison results above-mentioned.

Also, the processing which is shown in the flowchart FIG. 2 to 4 are executed with their functions by storing the reception decision program in a recording medium such as a flexible disk, a CD-ROM, an optical magnetic disk, RAM, or ROM, loading it into the computer via a drive unit for the storage medium, and executing it.

While this invention has been described in connection with certain exemplary embodiments, it is to be understood that the subject matter encompassed by way of this invention is not to be limited to those specific embodiments. On the contrary, it is intended for the subject matter of the invention to include all alternative, update, and equivalents as can be included within the spirit and scope of the following claims.

Further, the inventers' invention is to retain all equivalents of the claimed invention even if the claims are amended during prosecution.

What is claimed is:

1. A mobile terminal, comprising:
a communication parameter calculation unit for calculating a communication parameter that is used for estimating a state of a communication environment based on a reception signal transmitted from a base station;
a decision parameter setting unit for calculating a decision parameter including a reception decision period based on a result of estimation for the state of the communication environment, said decision parameter being generated by using the communication parameter calculated by the communication parameter calculation unit; and
a reception decision unit for carrying out a reception decision of the reception signal based on the communication parameter in a cycle of the reception decision period set by the decision parameter setting unit.

2. The mobile terminal according to claim 1, wherein the communication parameter comprises at least one of:
a target signal interference ratio (SIR) that shows an appropriate value of an SIR in a communication network between the mobile terminal and the base station;
a finger number that shows a number of paths at a time of being transmitted from the base station via a plurality of paths; and
a Common pilot channel-received signal code power (CPICH-RSCP) that shows a power value of each code of the reception signal transmitted from the base station by using a common pilot channel.

3. The mobile terminal according to claim 2, wherein the decision parameter further comprises one of an SIR reference value and a bit error rate (BER) reference value, which is calculated on a basis of the at least one of the target SIR, the finger number, and the CPICH-RSCP serving as the communication parameter.

4. The mobile terminal according to claim 3, wherein the decision parameter is appropriately updated based on a comparison with a preset threshold and the at least one of the target SIR, the finger number, and the CPICH-RSCP serving as the communication parameter.

5. The mobile terminal according to claim 2, wherein said reception decision period is increased when the state of the communication environment is estimated to be satisfactory.

6. A reception decision method in a mobile terminal, comprising:
receiving a reception signal transmitted from a base station;

calculating a communication parameter that is used for estimating a state of a communication environment of the mobile terminal based on the reception signal;

calculating a decision parameter including a reception decision period based on a result of estimation for the state of the communication environment, said decision parameter being generated by using the communication parameter calculated in the calculating of the communication parameter; and carrying out a reception decision of the reception signal for the mobile terminal based on the communication parameter in a cycle of the reception decision period set in the calculating of the decision parameter.

7. The reception decision method in a mobile terminal according to claim 6, wherein the communication parameter comprises at least one of:

a target SIR that shows an appropriate value of an SIR in a communication network between the mobile terminal and the base station;

a finger number that shows a number of paths at a time of being transmitted from the base station via a plurality of paths; and a CPICH-RSCP that shows a power value of each code of the reception signal transmitted from the base station by using a common pilot channel.

8. The reception decision method in the mobile terminal according to claim 7, wherein the decision parameter comprises one of an SIR reference value and BER reference value, which is calculated on a basis of the at least one of the target SIR, the finger number, and the CPICH-RSCP serving as the communication parameter.

9. The reception decision method in the mobile terminal according to claim 8, wherein the decision parameter is appropriately updated based on a comparison with a preset threshold and the at least one of the target SIR, the finger number, and the CPICH-RSCP serving as the communication parameter.

10. A reception decision method in a mobile terminal which receives a signal transmitted from a base station and carries out a reception decision at a present time, the reception decision method comprising:

calculating one of a bit error rate (BER) and a block error rate (BLER) by using the signal transmitted from the base station, the signal comprising the reception signal;

calculating a communication parameter corresponding to a communication environment of the mobile terminal from one of the reception signal, the BER, and the BLER;

calculating a decision parameter, including a reception decision period, from the communication parameter based on a comparison with a preset threshold and the communication parameter; and carrying out the reception decision of the reception signal for the mobile terminal based on the communication parameter in a cycle of the reception decision period.

11. The reception decision method in a mobile terminal according to claim 10, wherein the communication parameter comprises at least one of:

a target SIR that shows an appropriate value of an SIR in a communication network between the mobile terminal and the base station;

a finger number that shows a number of paths at a time of being transmitted from the base station via a plurality of paths; and a CPICH-RSCP that shows a power value of each code of the reception signal transmitted from the base station by using a common pilot channel.

12. The reception decision method in the mobile terminal according to claim 11, wherein the decision parameter comprises one of an SIR reference value and a BER reference value, which is calculated on a basis of the at least one of the target SIR, the finger number, and the CPICH-RSCP serving as the communication parameter.

13. The reception decision method in the mobile terminal according to claim 12, wherein the decision parameter is appropriately updated based on a comparison with a preset threshold and the at least one of the target SIR, the finger number, and the CPICH-RSCP serving as the communication parameter.

14. The method according to claim 10, wherein said calculating the decision parameter is based on a result of estimation for a state of the communication environment generated by using the communication parameter calculated in the calculating of the communication parameter.

15. The method according to claim 10, wherein said calculating the decision parameter is based on the communication environment from one of the BER and BLER generated by using the communication parameter calculated in the calculating of the communication parameter.

16. The method according to claim 10, wherein said calculating the decision parameter is based on the communication environment from the reception signal generated by using the communication parameter calculated in the calculating of the communication parameter.

17. A non-transitory computer-readable storage medium encoded with a computer program for executing a reception decision method in a mobile terminal, said program comprising:

allowing said mobile terminal to receive a reception signal transmitted from a base station;

calculating a communication parameter that is used for estimating a state of a communication environment of the mobile terminal based on the reception signal;

calculating a decision parameter including a reception decision period based on a result of estimation for the state of the communication environment, said decision parameter being generated by using the communication parameter calculated in the calculating of the communication parameter; and carrying out a reception decision of the reception signal for the mobile terminal based on the communication parameter in a cycle of the reception decision period set in the calculating of the decision parameter.

18. The non-transitory computer-readable storage medium encoded with a computer program for executing the reception decision method in the mobile terminal according to claim 17, wherein the communication parameter comprises at least one of:

a target SIR that shows an appropriate value of an SIR in a communication network between the mobile terminal and the base station;

a finger number that shows a number of paths at a time of being transmitted from the base station via a plurality of paths; and a CPICH-RSCP that shows a power value of each code of the reception signal transmitted from the base station by using a common pilot channel.

19. The non-transitory computer-readable storage medium encoded with a computer program for executing the reception decision method in the mobile in a mobile terminal according to claim 18, wherein the decision parameter comprises one of an SIR reference value and a BER reference value, which is calculated on the basis of the at least one of the target SIR, the finger number, and the CPICH-RSCP serving as the communication parameter.

20. The non-transitory computer-readable storage medium encoded with a computer program for executing the reception decision method in the mobile terminal according to claim 19, wherein the decision parameter is appropriately updated based on a comparison with a preset threshold and the at least one of the target SIR, the finger number, and the CPICH-RSCP serving as the communication parameter.

* * * * *